United States Patent

Riley et al.

[11] Patent Number: 6,055,437
[45] Date of Patent: Apr. 25, 2000

[54] DYNAMIC ALLOCATION OF COMMUNICATION RESOURCES

[75] Inventors: Ralph G. Riley, Schaumburg; Ming Chen, Elgin, both of Ill.

[73] Assignee: Motorola, Inc., Schaumburg, Ill.

[21] Appl. No.: 08/951,281

[22] Filed: Oct. 16, 1997

Related U.S. Application Data

[63] Continuation of application No. 08/646,796, May 21, 1996, abandoned.
[51] Int. Cl.$^7$ .............................. H04B 7/00; H04Q 7/20
[52] U.S. Cl. ........................ 455/511; 455/450; 370/522
[58] Field of Search .................................. 455/450, 451, 455/452, 453, 455, 464, 509, 511, 512, 513, 514, 515, 516, 62; 370/264, 329, 336, 337, 345, 347, 348, 468, 522, 523

[56] References Cited

U.S. PATENT DOCUMENTS

| 5,195,086 | 3/1993 | Baumgartner et al. | 370/264 |
| 5,239,678 | 8/1993 | Grube et al. | 455/511 |
| 5,457,735 | 10/1995 | Erikson . | |

Primary Examiner—Nguyen Vo
Assistant Examiner—Sam Bhattacharya
Attorney, Agent, or Firm—Christopher P. Moreno; Susan L. Lukasik

[57] ABSTRACT

Responsive to a received call request, a resource controller (105) assigns a first control channel to the call request (302). When there are no traffic channels available and there is at least one pending call request (303–304), it is determined whether there is a second control channel, combinable with the first control channel, available from a group of un-assigned control channels (305). Alternatively, it is determined whether the second control channel is available from a group of assigned control channels (308). The second control channel, when available, is assigned along with the first control channel as an additional traffic to one of the pending call requests (307).

12 Claims, 3 Drawing Sheets

DYNAMIC ALLOCATION OF COMMUNICATION RESOURCES

This is a continuation of U.S. application Ser. No. 08,646,796, filed MAY 21, 1996 and now abandoned.

FIELD OF THE INVENTION

The present invention relates generally to wireless communication systems and, in particular, to the dynamic allocation of communications resources therein.

BACKGROUND OF THE INVENTION

Wireless communications systems are well-known in the art. A problem common to many wireless communication systems is how to process a continuous stream of requests for communication given only a limited number of communication resources. This problem and the solutions applied to it may be generally described into two ways.

In the first case, there are more communication requests made than can be handled by the limited number of communication resources. This problem is generally addressed in U.S. Pat. No. 5,457,735 by Erickson entitled METHOD AND APPARATUS FOR QUEUING RADIO TELEPHONE SERVICE REQUESTS and having the same assignee as the present invention. In the Erickson patent, pending call requests (i.e., call requests that are awaiting the availability of communication resources) are queued. The pending call requests are either serviced once communication resources are available, or they are dropped from the queue if communication resources do not become available within a finite period of time after they have been queued. Although the Erickson patent represents an advance in the art, particularly with regard to the Processing of telephone interconnect calls, no disclosure is made regarding how the allocation of communication resources can be managed such that the possibility of a call being dropped from the queue is minimized.

In the second case, the procedures for the allocation of communication resources fail to recognize those instances in which allocation of a given communication resource may actually restrict the possibilities for further allocation of other communication resources. In current communication systems, once a communication request is received, one or more communication resources are automatically assigned to that request. Generally, the one or more communication resources thus assigned are chosen by scanning a list of possible resources and selecting the first resources found to be available. However, it is possible that the selection of a given resource for a current call request will actually prevent other communication resources from being used in response to future call requests. As a result, the future call requests may be denied. Such inefficiencies have a negative affect on user perceptions regarding access times and system availability. Therefore, it would be advantageous to provide resource allocation techniques that minimize the probability of queued calls being dropped and that maximize the efficient assignment of communication resources.

DESCRIPTION OF A PREFERRED EMBODIMENT

In general, the present invention provides resource allocation techniques offering improved efficiency over prior art techniques. In accordance with the present invention, responsive to a received call request, a resource controller assigns a first control channel to the call request. When the resource controller determines that there are no traffic channels available and that there is at least one pending call request (corresponding to a call request received prior to the current call request), the resource controller determines whether there is a second control channel, combinable with the first control channel, available from a group of un-assigned control channels. Alternatively, the resource controller can determine whether the second control channel is available from a group of assigned control channels corresponding to pending call requests. Regardless of whether it comes from the un-assigned or assigned group of control channels, the second control channel, when available, is assigned along with the first control channel as an additional traffic to one of the pending call requests, thereby allowing the pending call request to proceed. In this manner, the efficiency of call request processing and communication resource allocation is improved.

Figure 1:
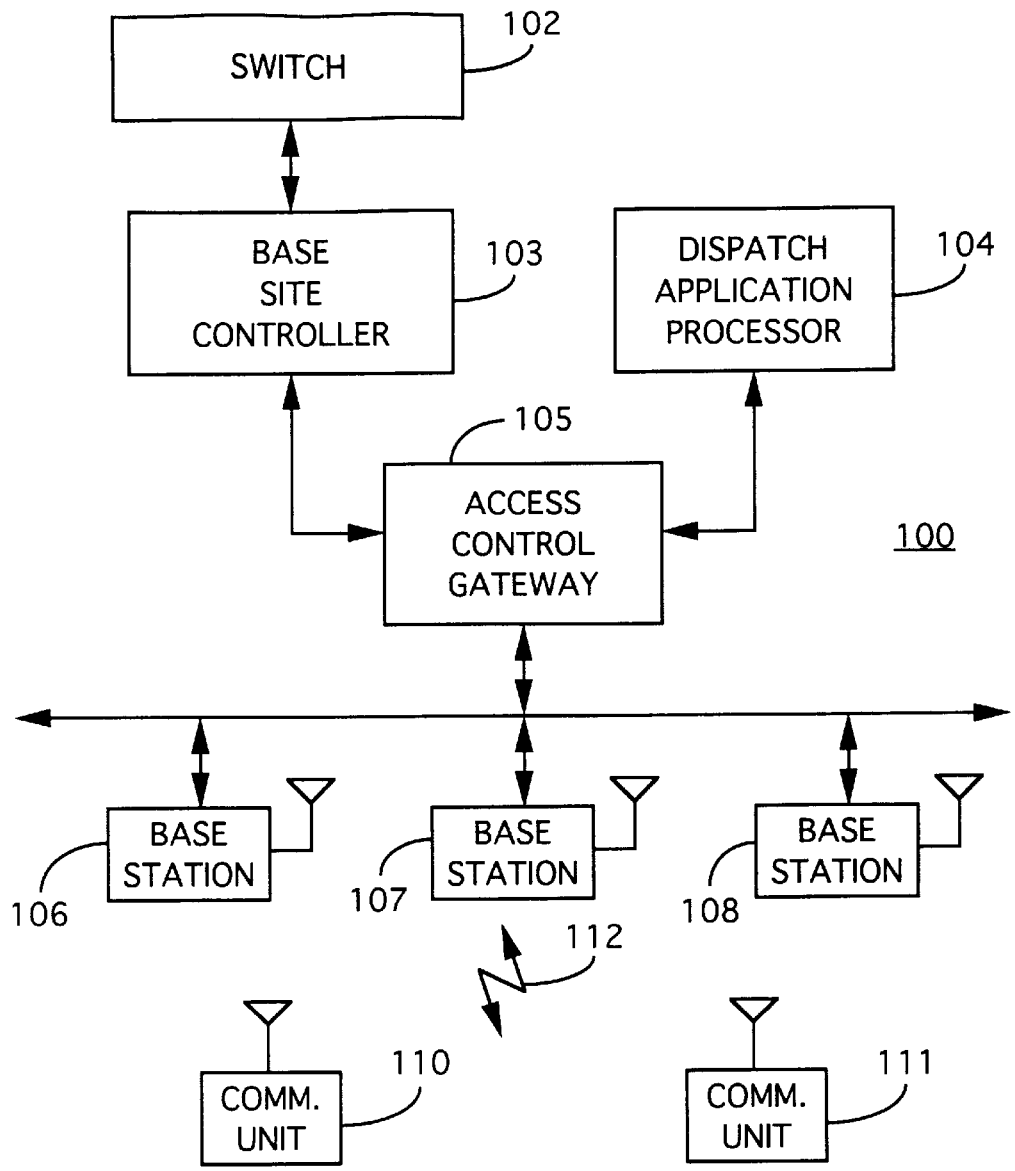
FIG. 1 is a block diagram of a wireless communication system.

The present invention can be more fully described with reference to FIGS. 1–7. FIG. 1 is a block diagram of a wireless communication system 100. In particular, FIG. 1 depicts an access control gateway (ACG) 105 configured in accordance with the present invention in the communication system 100, which supports both telephone and dispatch services, as known in the art. An example of such a communication system is an iDEN™ system by Motorola, Inc. Briefly stated, the ACG 105 is coupled to a switch 102 that provides access to the public switched telephone network (PSTN) through a base site controller (BSC) 103 to support telephone services. To support dispatch services, a dispatch application processor (DAP) 104 is coupled to the ACG 105. In order to provide telephone and dispatch services to communication units 110–111, a plurality of wireless base stations 106–108 are coupled to the access control gateway 105. Wireless carriers 112 are used to convey communications between the base stations 106–108 and communication units 110–111.

The ACG 105 includes a digital computer, a queue memory and a program memory (not shown), the program memory having a program stored thereon to be executed by the digital computer. In particular, the digital computer and program memory can be used to implement a resource controller, the operation of which is discussed in further detail below. Additionally, the queue memory is used, at least in part, to implement a queue, as discussed below. The digital computer can comprise current prior art computational platforms. (Such platforms are well understood in the art and therefore will not be further described here).

In this particular embodiment, the ACG 105 determines the communication services requested by the communication units 110–111 via the base stations 106–108 and relays these requests to the appropriate processor 103–104. Responsive to such a request, the ACG 105 assigns a control channel to the requesting unit. To support the request for communication service from a given unit 110, the ACG 105 receives a resource allocation (i.e., identification of an available traffic channel) from the processors 103–104 and relays, this information to the unit 110 via the base stations 106–108.

Figure 2:
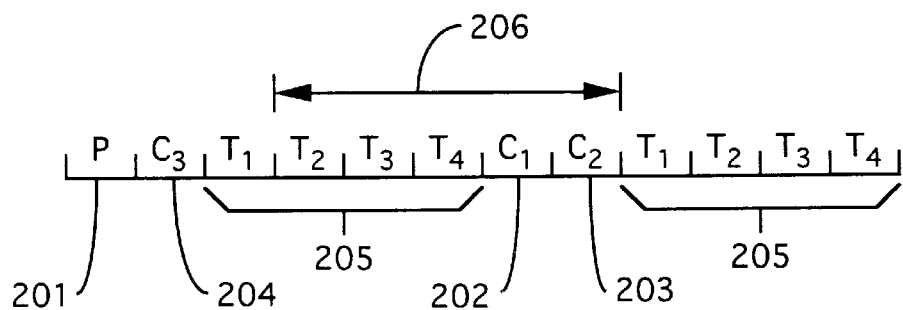
FIG. 2 depicts time slots used for communications in the wireless communication system of FIG. 1.

FIG. 2 depicts time slots used for communications in the wireless communication system 100. As known in the art, the time slots are implemented as logical divisions in time of the wireless carriers 112. The time slots shown are implemented on both inbound and outbound paths within the system 100. The relative ordering of the time slots is further propagated within the infrastructure 102–108 of the communication system 100. In the preferred embodiment, the time slots are logically grouped together in groups of -twelve contiguous time slots, with each logical grouping delimited at the start by a primary control channel 201 The pattern of the logical grouping of time slots is continuously repeated; in this manner, continuous paths for communications are provided. In practice, the primary control channel 201 used for inbound system access and for outbound paging and control signaling, as known in the art.

Additionally, the time slots comprise control channels (sometimes known in the art as dedicated control channels) 202–204 and traffic channels 205. It is these control and traffic channels that form the communication resources controlled by the resource controller. In practice, control channels can be converted for use as part of a traffic channel and, likewise, traffic channels can be converted into pairs of control channels. Thus, although there are three dedicated control channels (labeled $C_1$ through $C_3$) and four traffic channels (labeled $T_1$ through $T_4$) shown for exemplary purposes, other combinations and orderings of control and traffic channels are possible. The control channels 202–204 are generally used for call set-up procedures. The traffic channels 205 are used for the conveyance of voice and/or data information within the system. Each traffic channel comprises a pair of time slots within the logical grouping of time slots having an interleave difference equivalent to a valid traffic channel interleave 206. In the example of FIG. 2, the valid traffic channel interleave 206 is five time slots, although in the preferred embodiment, it is also possible to have a valid traffic channel interleave of two time slots. Of course, other valid traffic channels interleaves may be possible.

Figure 3:
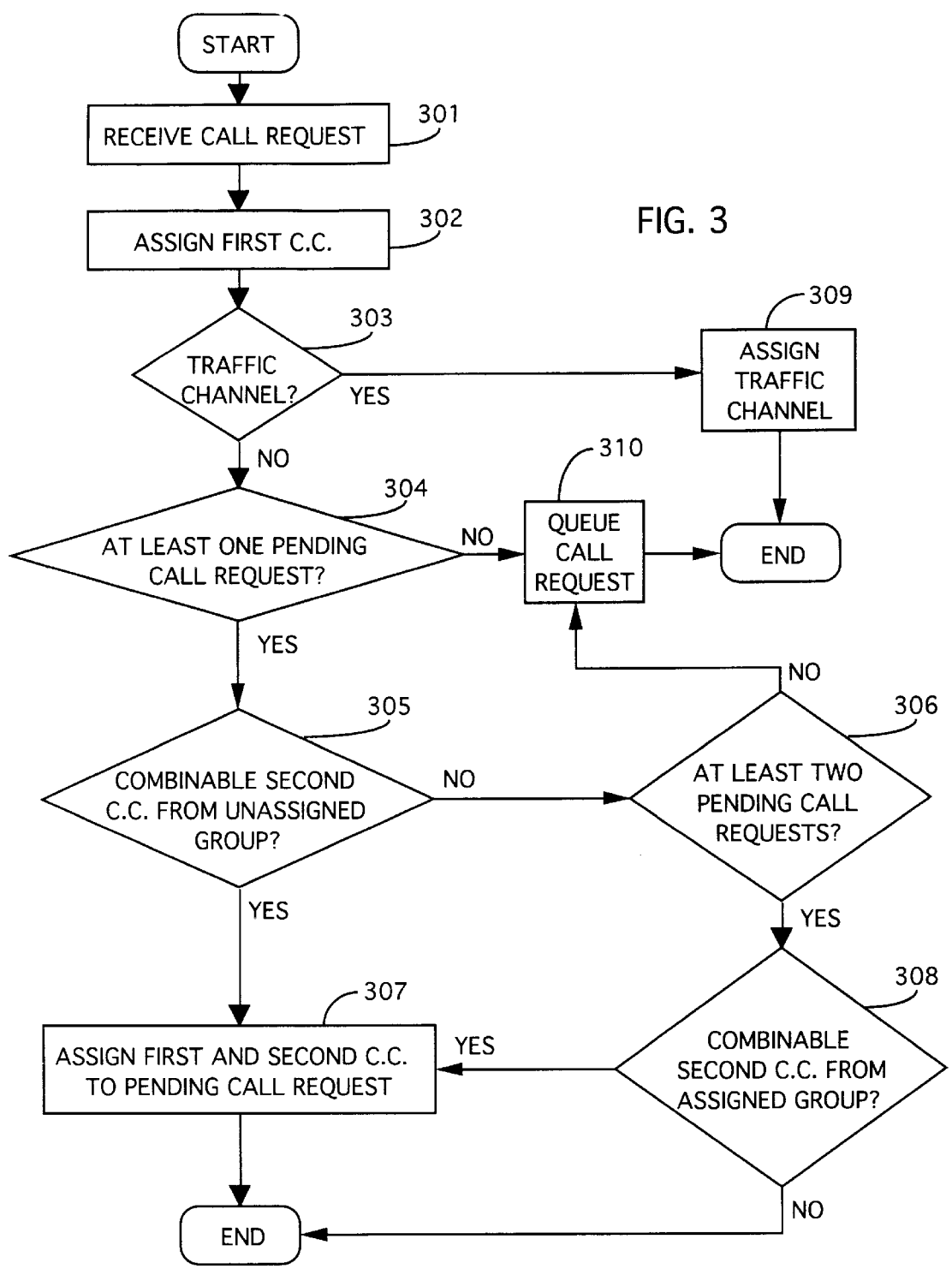
FIG. 3 is a flowchart of a method for dynamically allocating resources in accordance with the present invention.
Figure 4:
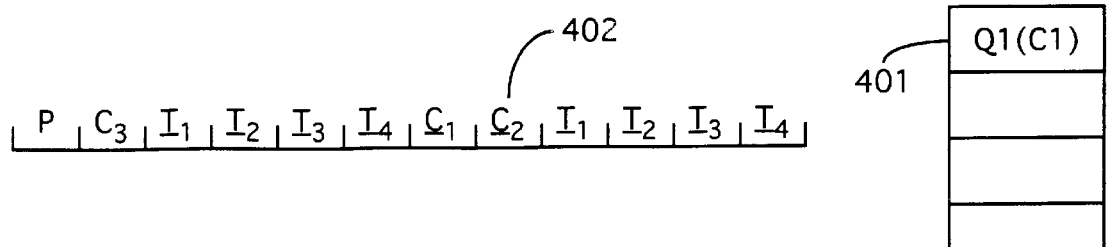
FIGS. 4–7 illustrate examples of dynamic traffic channel allocation in accordance with the method of FIG. 3.

With the above embodiments in mind, and with further reference to FIGS. 3–7, operation of present invention may be more fully described. FIG. 3 is a flowchart of a method for dynamically allocating resources in accordance with the present invention. In the preferred embodiment, the steps shown in FIG. 3 are performed by the resource controller portion of the ACG 105. However, alternate embodiments are possible in which the functionality of the resource controller is distributed so that the steps shown in FIG. 3 are executed at various points within the system.

At step 301, a call request is received. Typically, the call request will specify a particular type of service that the requesting communication unit has selected to use, such as a telephone interconnect call. Responsive to the call request, at step 302, the resource controller will assign a first control channel (as described above) to the call request. As such, the first control channel is available for use in call set-up procedures. In this embodiment, the first control channel is assigned without consideration to other available control channels; typically, the first available control channel as determined by a list of available control channels is assigned.

Before the requested communication can proceed, it is determined at step 303 whether a traffic channel is currently available, i.e., un-assigned to another call. If there is a traffic channel available, then it is assigned to the call at step 309.

However, if there is no traffic channel currently available, it is determined at step 304 whether there is currently at least one pending (queued) call request. If not, the call request received at step 301 is queued and further processed in accordance with prior art techniques. If there is at least one pending call request, it is determined, at step 305, whether a second control channel, combinable with the first control channel, is available from an un-assigned group of control channels. As described above, combinable control channels are those control channels that can be combined to establish a valid traffic channel. The un-assigned group of control channels comprises those control channels currently not assigned to any pending or ongoing call request.

Figure 5:
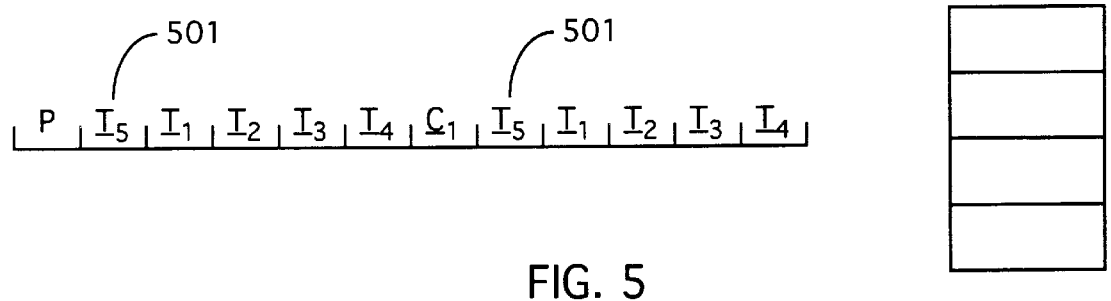

If a combinable second control channel is available from the un-assigned group, the first and second control channels, at step 307, are assigned as an additional traffic channel to one of the at least one pending call requests; preferably, to an oldest call request (in the sense of having been queued for the longest period of time) of the at least ore call request. The results of steps 305 through 307 are further illustrated in FIGS. 4 and 5. In particular a pending c:all request (Q1) 401 is shown in a queue. The pending call request has previously been assigned a control channel ($\underline{C}_1$) while awaiting availability of a traffic channel. (Hereinafter, control and traffic channels illustrated in the figures without an underbar are consider un-assigned, whereas control and traffic channels illustrated with an underbar are assigned to a particular call request.) When a current call request is received (as in step 301), a first control channel ($\underline{C}_2$) 402 is assigned to the call request. After acknowledging the existence of the pending call request, the resource controller determines that there is a second control channel ($C_3$) currently un-assigned and combinable with the first control channel (i.e., they have a valid traffic channel interleave distance). As a result, as shown in FIG. 5, the first control channel and the second control channel are converted into an additional traffic channel ($\underline{T}_5$) 501 and assigned to the pending call request, which is then removed from the queue. Because the first control channel is no longer available, the current call request is immediately denied. Using prior art techniques, both the current call request and the pending call request would have remained in the queue until both timed out awaiting a traffic channel.

Continuing with FIG. 3, if, at step 305, it is determined that there are no combinable second control channels available from an un-assigned group, it is determined at step 306 whether there are at least two pending call requests. If not, the call request is queued at step 310. If there are at least two pending call requests, it is determined, at step 308, whether the second control channel, combinable with the first control channel, is available from an assigned group of control channels. The assigned group of control channels comprises those control channels currently assigned to the at least two pending call requests. In this manner, the present invention allows control channels assigned to queued call requests to be considered for use if possible.

If a combinable second control channel is available from the assigned group, the first and second control channels, at step 307, are assigned as an additional traffic channel to one of the at least two pending call requests provided that the one of the two pending call requests does not correspond to the second control channel. In this manner, a communication unit corresponding to the one of the at least two pending call requests can proceed with its requested communication using the additional traffic channel. In effect, the control channels from the current call request and a pending call request are being preempted for use as a traffic channel for yet another pending call request. Preferably, the one of the two pending call requests is an oldest possible call request of the at least two call requests. Stated another way, the second control channel preferably corresponds to a pending call request that has been queued for less time than the pending call request to which it is subsequently assigned as part of the additional traffic channel.

Figure 6:
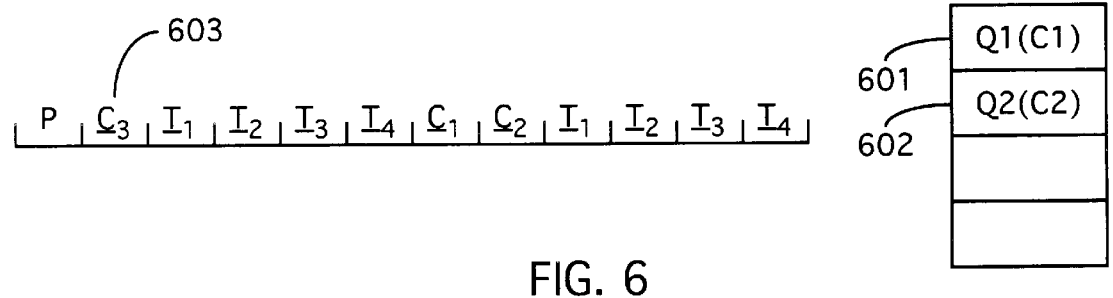
Figure 7:
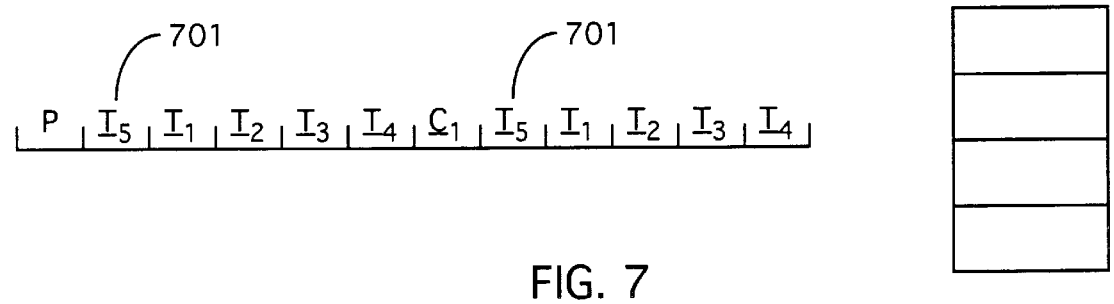

The results of steps 306, 308 and 307 are further illustrated in FIGS. 6 and 7. In particular, two pending call requests (Q1 and Q2) 601–602 are shown in a queue. The two pending call requests 601–602 have been chronologically stored in the queue, with the pending call request at the top of the queue (Q1) being next in line for available resources by virtue of its greater age within the queue. The pending call have previously been assigned control channels ($C_1$ and $C_2$, respectively) while awaiting availability of a traffic channel. When a current call request is received (as in step 301), a first control channel ($C_3$) 603 is assigned to the call request. After acknowledging the existence of the two pending call requests, the resource controller determines that there is a second control channel ($C_2$) currently assigned to a pending call request (Q2) that is combinable with the first control channel (i.e., they have a valid traffic channel interleave distance). As a result, as shown in FIG. 7, the first control channel and the second control channel are converted into an additional traffic channel ($T_5$) 701 and assigned to the oldest possible pending call request which does not correspond to the second control channel (in this case, Q1), which is then removed from the queue. Because the first control channel is no longer available, the current call request is immediately denied. Additionally, because its corresponding control channel has be reassigned to another pending call request, newer of the two pending call requests is also removed from the queue. Using prior art techniques, the current call request and the two pending call requests would have remained in the queue until they timed out awaiting a traffic channel. As a result, none of the calls would be serviced. The present invention offers the advantage that pending call requests can be serviced in a more timely fashion. Additionally, although the current call request (and possibly another pending call request) may be denied as a result, such denial can be indicated immediately, rather than waiting for a queue time out.

The present invention provides resource allocation techniques offering improved efficiency over prior art techniques. By recognizing the availability of combinable control channels from either assigned or un-assigned control channels, the present invention allows additional control channels to be created, which additional control channels can then be used to process call requests. These techniques thereby help minimize the probability of a call request never being allowed to proceed.

We claim:

1. In a resource controller, a method for dynamically allocating communications resources, the method comprising steps of:
   a) receiving a call request;
   b) assigning a first control channel to the call request;
   c) determining that there are no traffic channels available;
   d) determining that there is at least one pending call request;
   e) determining whether a second control channel, combinable with the first control channel, is available from an un-assigned group of control channels; and
   f) assigning the first and the second control channels as an additional traffic channel to one of the at least one pending call request when the second control channel is available from the un-assigned group of control channels.

2. The method of claim 1, step (e) further comprising the step of determining whether the second control channel is available from the un-assigned group of control channels, wherein the first and the second control channels have an interleave difference equal to a valid traffic channel interleave.

3. The method of claim 1, step (f) further comprising the step of assigning the first and the second control channels to the one of the at least one pending call request, wherein the one of the at least one pending call request is an oldest call request of the at least one pending call request.

4. The method of claim 1, further comprising steps of:
   when the second control channel is not available from the un-assigned group of control channels;
   g) determining that there are at least two pending call requests;
   h) determining whether the second control channel, combinable with the first control channel, is available from an assigned group of control channels, the assigned group of control channels corresponding to the at least two pending call requests; and
   i) assigning the first and the second control channels as the additional traffic channel to one of the at least two pending call requests when the second control channel is available from the assigned group of control channels, wherein the second control channel does not correspond to the one of the at least two pending call requests.

5. The method of claim 4, step (h) further comprising the step of determining whether the second control channel is available from the assigned group of control channels, wherein the first and the second control channels have an interleave difference equal to a valid traffic channel interleave.

6. The method of claim 4, step (i) further comprising the step of assigning the first and the second control channels to the one of the at least two pending call requests, wherein the one of the at least two pending call requests is an oldest possible call request oi the at least two pending call requests.

7. In a wireless communication system that includes a plurality of communication units and a resource controller that allocates a plurality of communications resources among the plurality of communication units, the plurality of communications resources being dynamically configurable as control channels and traffic channels, a method for establishing a communication, the method comprising steps of:
   a) transmitting, by a communication unit of the plurality of communication units, a call request;
   b) receiving, by the resource controller, the call request;
   c) assigning, by the resource controller, a first control channel to the call request;
   d) determining, by the resource controller, that there are no traffic channels available;
   e) determining, by the resource controller, that there is at least one pending call request; another
   f) determining, by the resource controller, whether a second control channel, combinable with the first control channel, is available from an un-assigned group of control channels;
   g) assigning, by the resource controller, the first and the second control channels as an additional traffic channel to one of the at least one pending call request when the second control channel is available from the un-assigned group of control channels; and h) communicating, by an other communication unit of the plurality of communication units corresponding to the one of the at least one pending call reguest, via the additional traffic channel.

8. The method of claim 7, step (f) further comprising the step of determining whether the second control channel is available from the un-assigned group of control channels, wherein the first and the second control channels have an interleave difference equal to a valid traffic channel interleave.

9. The method of claim 7, step (g) further comprising the step of assigning the first and the second control channels to the one of the at least one pending call request, wherein the one of the at least one pending call request is an oldest call request of the at least one pending call request.

10. The method of claim 7, further comprising steps of: when the second control channel is not available from the un-assigned group of control channels;

i) determining, by the resource controller, that there are at least two pending call requests;

j) determining, by the resource controller, whether the second control channel, combinable with the first control channel, is available from an assigned group of control channels, the assigned group of control channels corresponding to the at least two pending call requests;

k) assigning, by the resource controller, the first and the second control channels as the additional traffic channel to one of the at least two pending call requests when the second control channel is available from the assigned group of control channels, wherein the second control channel does not correspond to the one of the at least two pending call requests; and l) communicating, by the other communication unit corresponding to the one of the at least two pending call requests, via the additional traffic channel.

11. The method of claim 10, step (j) further comprising the step of determining whether the second control channel is available from the assigned group of control channels, wherein the first and the second control channels have an interleave difference equal to a valid traffic channel interleave.

12. The method of claim 10, step (k) further comprising the step of assigning the first and the second control channels to the one of the at least two pending call requests, wherein the one of the at least two pending call requests is an oldest possible call request of the at least two pending call requests.

* * * * *